(12) United States Patent
Manabe et al.

(10) Patent No.: US 9,843,675 B2
(45) Date of Patent: Dec. 12, 2017

(54) CALLING DEVICE, COMMUNICATION SYSTEM, AND CALLING METHOD FOR EXECUTING CALL FOR COMMUNICATION

(71) Applicant: JVC KENWOOD Corporation, Yokohama-shi, Kanagawa (JP)

(72) Inventors: Shunichi Manabe, Yokohama (JP); Ichiro Shishido, Yokohama (JP); Tomoko Yaginuma, Yokohama (JP); Masae Toko, Yokohama (JP); Yoshihiro Hotta, Yokohama (JP); Kazuya Tsukamoto, Yokohama (JP)

(73) Assignee: JVC KENWOOD Corporation, Yokohama-shi (JP)

(*) Notice: Subject to any disclaimer, the term of this patent is extended or adjusted under 35 U.S.C. 154(b) by 0 days.

(21) Appl. No.: 15/275,406

(22) Filed: Sep. 25, 2016

(65) Prior Publication Data

US 2017/0094056 A1    Mar. 30, 2017

(30) Foreign Application Priority Data

Sep. 28, 2015  (JP) ................................. 2015-189924

(51) Int. Cl.
*H04W 4/02*  (2009.01)
*H04M 3/42*  (2006.01)

(52) U.S. Cl.
CPC ....... *H04M 3/42357* (2013.01); *H04W 4/023* (2013.01)

(58) Field of Classification Search
CPC ........... H04W 4/02; H04W 4/08; H04W 4/10; H04W 4/021; H04W 4/22; H04W 4/023; H04M 3/42042; H04M 2250/10; H04M 3/42357; G01S 19/13; G01S 5/0263
USPC ............ 455/456.3, 414, 1, 95, 417; 709/202
See application file for complete search history.

(56) References Cited

U.S. PATENT DOCUMENTS

2013/0346471 A1* 12/2013 Park ........................ H04L 67/10
709/202

FOREIGN PATENT DOCUMENTS

JP    2009-177639    8/2009

\* cited by examiner

*Primary Examiner* — Phuoc H Doan
(74) *Attorney, Agent, or Firm* — Brundidge & Stanger, P.C.

(57) ABSTRACT

A receiving unit receives positional information of a terminal device. A storage unit stores a list in which a plurality of correspondence relationships between an area and an identifier are included. An adjusting unit adjusts the correspondence relationship included in the list. A first selection unit selects, from the adjusted list, an identifier corresponding to the received positional information. A first transmission unit transmits the selected identifier to the terminal device. An input unit inputs information on an area to be called. A second selection unit selects, from the adjusted list, an identifier corresponding to the input information. A second transmission unit transmits a call signal including the selected identifier.

8 Claims, 9 Drawing Sheets

FIG. 3

| 1 | 12 | 23 | 34 | 45 | 56 | 67 | 78 | 89 | 100 | 111 |
| 2 | 13 | 24 | 35 | 46 | 57 | 68 | 79 | 90 | 101 | 112 |
| 3 | 14 | 25 | 36 | 47 | 58 | 69 | 80 | 91 | 102 | 113 |
| 4 | 15 | 26 | 37 | 48 | 59 | 70 | 81 | 92 | 103 | 114 |
| 5 | 16 | 27 | 38 | 49 | 60 | 71 | 82 | 93 | 104 | 115 |
| 6 | 17 | 28 | 39 | 50 | 61 | 72 | 83 | 94 | 105 | 116 |
| 7 | 18 | 29 | 40 | 51 | 62 | 73 | 84 | 95 | 106 | 117 |
| 8 | 19 | 30 | 41 | 52 | 63 | 74 | 85 | 96 | 107 | 118 |
| 9 | 20 | 31 | 42 | 53 | 64 | 75 | 86 | 97 | 108 | 119 |
| 10 | 21 | 32 | 43 | 54 | 65 | 76 | 87 | 98 | 109 | 120 |
| 11 | 22 | 33 | 44 | 55 | 66 | 77 | 88 | 99 | 110 | 121 |

| AREA NO. | AREA COORDINATE |
|---|---|
| 1 | A |
| 2 | B |
| 3 | C |
| ⋮ | ⋮ |

| LIST NO. | LIST |
|---|---|
| 1 | FIRST LIST |
| 2 | SECOND LIST |
| ⋮ | ⋮ |

22

CALLING DEVICE, COMMUNICATION SYSTEM, AND CALLING METHOD FOR EXECUTING CALL FOR COMMUNICATION

CROSS-REFERENCE TO RELATED APPLICATION

This application is based upon and claims the benefit of priority from the prior Japanese Patent Application No. 2015-189924, filed on Sep. 28, 2015, the entire contents of which are incorporated herein by reference.

BACKGROUND

1. Field

The present invention relates to a communication technique, and in particular, to a calling device, a communication system, and a calling method for executing a call for communication.

2. Description of the Related Art

It is desirable to enable group communication through mobile stations located in a designated area without taking a time for setting the group communication. Accordingly, each mobile station acquires positional information on its own by an incidental GPS (Global Positioning System) receiver. A control office transmits a call signal for the group communication by adding area information on a mobile station that is a target of the group communication. The mobile station receives the group communication from the control office when the positional information on its own and the area information in the call signal match each other (for example, Patent Document 1).

[Patent Document 1] Japanese Patent Application Publication No. 2009-177639

Because positional information is generally indicated by latitude and longitude, area information to be compared with the positional information is also indicated by them. On the other hand, it is more desirable that a call of group communication in a desired area is simpler.

SUMMARY

In order to solve the aforementioned issue, a calling device of an embodiment comprises: a receiving unit that receives positional information of a terminal device; a storage unit that stores a list in which a plurality of correspondence relationships between an area including positional information that can be received in the receiving unit and an identifier are included; an adjusting unit that adjusts the correspondence relationship included in the list stored in the storage unit; a first selection unit that selects, from the list adjusted in the adjusting unit, an identifier corresponding to the positional information received in the receiving unit; a first transmission unit that transmits the identifier selected in the first selection unit to the terminal device; an input unit that inputs information on an area to be called; a second selection unit that selects, from the list adjusted in the adjusting unit, an identifier corresponding to the information input in the input unit; and a second transmission unit that transmits a call signal including the identifier selected in the second selection unit.

Another aspect of an embodiment is a communication system. This communication system comprises a calling device and a terminal device. The calling device comprises: a receiving unit that receives positional information of a terminal device; a storage unit that stores a list in which a plurality of correspondence relationships between an area including positional information that can be received in the receiving unit and an identifier are included; an adjusting unit that adjusts the correspondence relationship included in the list stored in the storage unit; a first selection unit that selects, from the list adjusted in the adjusting unit, an identifier corresponding to the positional information received in the receiving unit; a first transmission unit that transmits the identifier selected in the first selection unit to the terminal device; an input unit that inputs information on an area to be called; a second selection unit that selects, from the list adjusted in the adjusting unit, an identifier corresponding to the information input in the input unit; and a second transmission unit that transmits a call signal including the identifier selected in the second selection unit.

Still another aspect of an embodiment is a calling method. This method comprises the steps of: receiving positional information of a terminal device; adjusting correspondence relationship in a list in which a plurality of correspondence relationships between an area including positional information that can be received and an identifier are included; selecting, from the adjusted list, a first identifier corresponding to the received positional information; transmitting the selected first identifier to the terminal device; inputting information on an area to be called; selecting, from the adjusted list, a second identifier corresponding to the input information; and transmitting a call signal including the selected second identifier.

It is to be noted that any optional combination of the aforementioned constituent elements and any embodiment obtained by transforming what is expressed by the present embodiments into a method, an apparatus, a system, a recording medium, a computer program, and so on are also effective as other aspects of the present embodiments.

BRIEF DESCRIPTION OF THE DRAWINGS

Embodiments will now be described, byway of example only, with reference to the accompanying drawings, which are meant to be exemplary, not limiting, and wherein like elements are numbered alike in several figures, in which:

FIG. 3 is a view illustrating an area corresponding to a list stored in a storage unit in FIG. 2;

FIG. 4 is a view illustrating a data structure of the list stored in the storage unit in FIG. 2;

FIG. 5 is a view illustrating another data structure of the list stored in the storage unit in FIG. 2;

DETAILED DESCRIPTION

Figure 1:
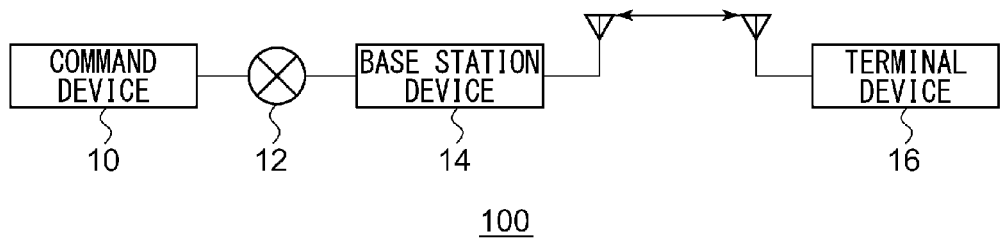
FIG. 1 is a view illustrating a configuration of a communication system according to Example 1.

The invention will now be described by reference to the preferred embodiments. This does not intend to limit the scope of the present invention, but to exemplify the invention.

EXAMPLE 1

Prior to the specific description of the present invention, the outline thereof will be given first. Example 1 relates to a communication system corresponding to business-use radio. In the business-use radio, audio communication is executed through a predetermined radio channel. One example of the audio communication is PTT (Push to Talk). In PTT, a user pushes a button at the beginning of a phone conversation and releases the button at the end of it. In the business-use radio, it is also possible to form a group by a plurality of terminal devices. A base station device in the business-use radio assigns an uplink channel and a downlink channel to the group. Under such a situation, one terminal device of the group transmits a signal through the uplink channel, and other terminal devices thereof receive the signal through the downlink channel. In a call of such group communication, a plurality of terminal devices included in the group are called.

However, there is a case where it is desirable to call a terminal device present in a specific location as a communication target. Examples of the case include, for example, a case where a fire has occurred in a building and the headquarters of a fire department needs, upon receiving a report of the fire, to perform a phone conversation with a fireman (or firemen) or a policeman (policemen) present closest to the fire scene in order to dispatch firemen and policemen thereto. In order to call only a fireman (firemen) or a policeman (policemen) present close to a scene, work for identifying the position of the scene and who is the person present close thereto is required, even when the headquarters grasps the present position of each of firemen and policemen through a GPS device possessed by each of them, which takes time and effort. Further, a case is assumed in which, for example, in an area where safety is maintained during daytime but is decreased during nighttime, the number of patrolling policemen is increased during nighttime than during daytime. If a crime has occurred at a location in the area during nighttime and all of the policemen in charge of the area move to the crime scene, the patrol of areas other than the crime scene becomes poor, and hence in order to avoid such a situation, it is desirable to dispatch only the requisite minimum number of policemen to the scene.

In order to deal with this, a plurality of areas, each having a size of, for example, 1 km×1 km, are defined and an identifier for identifying an area (hereinafter, referred to as an "area No.") is given to each area in the communication system according to the present Example. A terminal device transmits the acquired positional information to a base station device, so that the base station device identifies an area No. based on the positional information. The terminal device stores the received area No. as the area No. of its own. The base station device transmits the identified area to the terminal device. Further, the base station device transmits, to a plurality of terminal devices, a call signal including an area No. corresponding to an area to be called. The terminal device executes communication when the area No. included in the call signal is the same as the area No. of its own. Further, the base station device adjusts a correspondence relationship between an area and an area No. in order to change the size of an area in a list in accordance with time.

FIG. 1 illustrates a configuration of a communication system 100 according to Example 1. The communication system 100 includes a command device 10, a network 12, a base station device 14, and a terminal device 16. The command device 10 is a communication device that is installed in the aforementioned headquarters in order to be operated by a commander of the headquarters. The commander executes a call of the terminal device 16 by operating the command device 10, and also executes communication with the called terminal device 16, for example, a phone conversation. Prior to the call, the command device 10 receives positional information to be called. The positional information is indicated, for example, by latitude and longitude.

Herein, the commander inputs positional information by inputting latitude and longitude to the command device 10. Alternatively, the commander may input positional information by selecting one point of map information that are displayed by a display unit (not illustrated) provided in the command device 10. The command device 10 outputs a call request including the positional information (hereinafter, referred to as "call information") to the base station device 14 via the network 12. The network 12 connects the command device 10 to the base station device 14. One base station device 14 is illustrated in FIG. 1 for clarity of the description, but a plurality of them may be connected to the network 12.

The base station device 14 is one corresponding to a business-use radio system. Because publicly known techniques may be used for business-use radio, description thereof will be omitted herein. The base station device 14 is connected to the terminal device 16 through business-use radio at one end side, and connected to the network 12 at the other end side. When call information from the network 12 is input, the base station device 14 generates a signal for calling the terminal device 16 (hereinafter, referred to as a "call signal") in the business-use radio system. The base station device 14 transmits the call signal to the terminal device 16. The transmission executed herein corresponds to broadcasting. Herein, at least one of the base station device 14 and the command device 10 may be collectively referred to as a "calling device."

The terminal device 16 can execute communication through business-use radio. The terminal device 16 is a communication device that is operated, for example, by a fireman or a policeman. A fireman or a policeman executes a phone conversation with the command device 10 by operating the terminal device 16. The phone conversation is initiated after a call signal from the base station device 14 is received. One terminal device 16 is illustrated in FIG. 1 for clarity of the description, but a plurality of the terminal devices 16 may be connected to the base station device 14.

Figure 2:
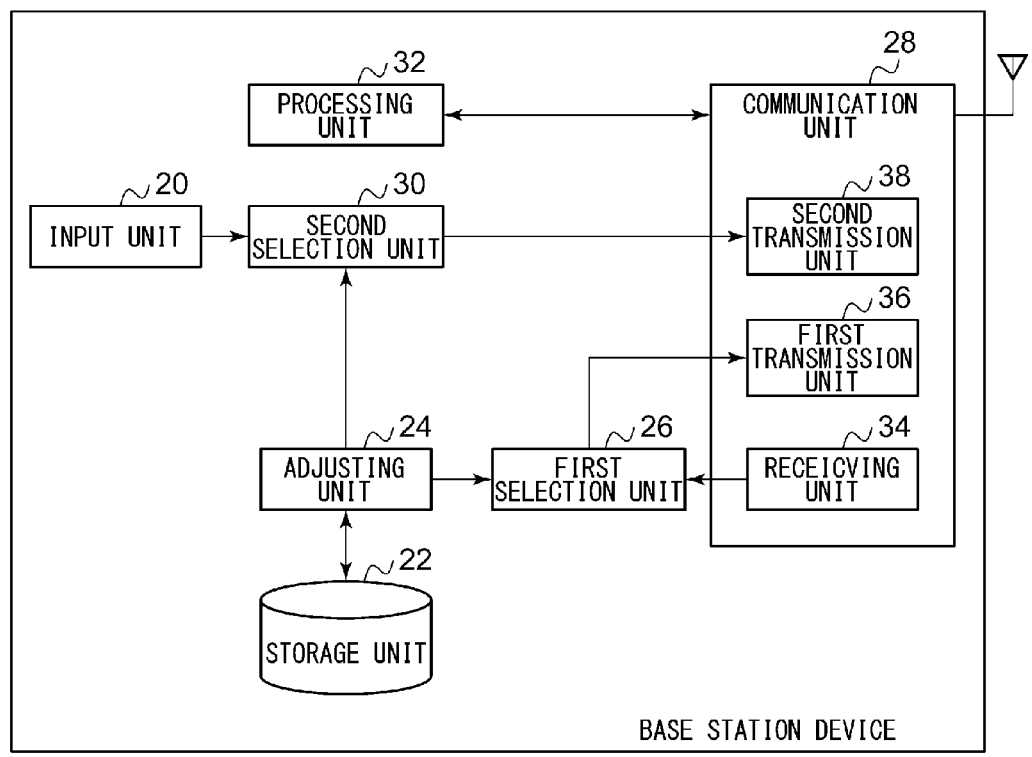
FIG. 2 is a view illustrating a configuration of a base station device in FIG. 1.

FIG. 2 illustrates a configuration of the base station device 14. The base station device 14 includes an input unit 20, a storage unit 22, an adjusting unit 24, a first selection unit 26, a communication unit 28, a second selection unit 30, and a processing unit 32. The communication unit 28 includes a receiving unit 34, a first transmission unit 36, and a second transmission unit 38. The storage unit 22 stores a list in which a plurality of correspondence relationships an area and an area No. are included. Herein, this list will be described with reference to FIG. 3. FIG. 3 illustrates areas corresponding to the list stored in the storage unit 22. A predetermined area is divided into rectangular-shaped areas each having a having a size of, for example, 1 km×1 km. An area No., such as "1," which is an identifier, is given to each area. The shape of the area may be an arbitrary shape without being limited to a rectangular shape. Additionally, the areas may overlap each other.

FIG. 4 illustrates a data structure of the list stored in the storage unit 22. As illustrated, an Area No. "and an Area Coordinate" are caused to correspond to each other. The area coordinate indicates the coordinates of two diagonal apexes of the area illustrated in FIG. 3. When the length of one side of the rectangular shape is known, the area coordinate may be the central coordinate of the area. The range of the jurisdictional area (jurisdictional range 200) of the headquarters, which is illustrated in FIG. 3, indicates a range where communication with the base station device 14 can be executed. Refer back to FIG. 2.

The adjusting unit 24 has a timing function, and acquires time. The adjusting unit 24 adjusts, in accordance with time, the correspondence relationship between an "area No." and an "area coordinate" included in the list stored in the storage unit 22. For example, when the time is within daytime (6:00 am to 6:00 pm), the adjusting unit 24 determines to use a list, which includes rectangular-shaped areas each having a size of 1 km×1 km and is included in the storage unit 22, as it is. On the other hand, when the time is within nighttime (6:00 pm to 6:00 am), the adjusting unit 24 adjusts the list such that the list has rectangular-shaped areas each having a size of 100 m×100 m. In that case, the adjusting unit 24 also changes area Nos. Alternatively, the adjusting unit 24 may adjust the list in accordance with a day of the week, month and day, elapsed days from the beginning of a month, ambient illuminance, atmospheric pressure (weather), temperature, humidity, seismic intensity, acceleration, wind speed, water level, or the like.

For example, a sensor for measuring an illuminance, atmospheric pressure, temperature, humidity, seismic intensity, acceleration, wind speed, water level, or the like, may be installed in the base station device 14 or an external device, and the adjusting unit 24 may acquire the sensor data in order to adjust the list in accordance with the data. Alternatively, the command device 10 or the base station device 14 may collect data from a plurality of sensors installed in a dispersed manner within the range of the jurisdictional area (jurisdictional range 200) of the headquarters, and the adjusting unit 24 may adjust the list based on the total data of them. Alternatively, the command device 10 or the base station device 14 may acquire various weather information from the outside, and the adjusting unit 24 may adjust the list based on the weather information. Alternatively, various sensors may be embedded in the terminal device 16 such that sensor data are also transmitted when positional information is transmitted from the terminal device 16 to the base station device 14, and the adjusting unit 24 may adjust the list by using the data. For example, the list is adjusted in accordance with a rule that is specified as follows: "when atmospheric pressure becomes 990 hPa or lower at 60% or more of observation points (positions where the sensors are installed and positions where the terminal devices 16 are present) within an area covered by the base station device 14, a low-pressure system, such as a typhoon, is expected to approach, and hence the area of an area where the risk of disaster occurrence is high, such as a seashore, river, or cliff, is made small (the area is finely divided)." Alternatively, the list may be adjusted by using a rule in which a plurality of time and various sensor data are combined. That is, the adjusting unit 24 can adjust the list in accordance with at least one information of time information, calendar information, and sensor information.

The adjustment may be performed in a way different from this. In that case, the storage unit 22 stores a plurality of types of lists in each of which a plurality of correspondence relationships between an area and an area No. are included. FIG. 5 illustrates another data structure of each of the lists stored in the storage unit 22. As illustrated, the plurality of types of lists are indicated as a first list, a second list, and the like, and an identifier (hereinafter, referred to as a "list No.") for identifying a list is given to each list. Similarly to FIG. 4, an area No. and an area coordinate are caused to correspond to each other in each list. For example, the first list is a list for daytime (6:00 am to 6:00 pm), and the second list is a list for nighttime (6:00 pm to 6:00 am). As described above, an area in the first list has a rectangular shape having a size of 1 km×1 km, while an area in the second list has a rectangular shape having a size of 100 m×100 m. That is, each of the plurality of types of lists corresponds to an area having a different size. In that case, the adjusting unit 24 selects one of the plurality of types of lists stored in the storage unit 22 in accordance with time. For example, the adjusting unit 24 selects the first list when the time is 6:00 am to 6:00 pm, and selects the second list when the time is 6:00 pm to 6:00 am. Herein, the aforementioned lists for daytime and nighttime are only illustrative, and three or more lists may be used. Refer back to FIG. 2.

The communication unit 28 has a transmitting and receiving function of the business-use radio system. The receiving unit 34 in the communication unit receives the positional information of a terminal device 16. The communication unit 28 outputs the received positional information to the first selection unit 26. The first selection unit 26 inputs the positional information from the communication unit 28. The first selection unit 26 identifies, of a plurality of areas that constitute the list adjusted in the adjusting unit 24, an area including the input positional information. Further, the first selection unit 26 identifies an area No. corresponding to the identified area. Thus, the first selection unit 26 selects, from the list, an area No. corresponding to the positional information. The first selection unit 26 outputs the area No. to the first transmission unit 36. In the following description, an area No. determined in accordance with the positional information on this terminal device 16 may be referred to as a "first area No."

The first transmission unit 36 inputs the area No. from the first selection unit 26. The first transmission unit 36 transmits the area No. to a terminal device 16 that has transmitted the positional information received by the communication unit 28. Herein, the first transmission unit 36 transmits the area No. before the later-described input unit 20 inputs call information. Alternatively, the first transmission unit 36 may transmit the area No. after the later-described input unit 20 inputs call information. In the latter case, the area No. is transmitted at a timing when a call signal is transmitted.

The input unit 20 inputs call information from the command device 10 via the non-illustrated network 12. Because positional information is included in the call information, as described above, it can be said that the call information is information on an area to be called. For example, when "hit-and-run" has occurred in the area "5," the positional information included in the call information indicates a coordinate within the area "5." Additionally, when a "fire" has occurred in the area "38," the positional information included in the call information indicates a coordinate within the area "38." The input unit 20 outputs the call information to the second selection unit 30.

The second selection unit 30 selects, from the list adjusted in the adjusting unit 24, an area No. corresponding to the positional information included in the call information. When the positional information is a coordinate within the area "5," the second selection unit 30 selects the area No. "5," as described above. Alternatively, the second selection unit 30 may select not only the area No. "5" but also the area No. at the periphery of the area No. "5." The second selection unit 30 generates a call signal including the selected one or more area Nos. in order to output to the second transmission unit 38. In the following description, the area No. based on this call information may be referred to as a "second area No."

The second transmission unit 38 inputs a call signal from the second selection unit 30. The second transmission unit 38 transmits the call signal. The transmission executed herein corresponds to broadcasting, as described above. When the communication unit 28 receives, after the transmission of the call signal, response signals to the call signal from one or more terminal devices 16, the processing unit 32 executes communication with the one or more terminal devices 16 via the communication unit 28.

This configuration is implemented in the hardware by any CPU of a computer, memory, and other LSI, and implemented in the software by a computer program or the like that is loaded in a memory. Herein, functional blocks implemented by the cooperation of hardware and software are depicted. Thus, it is to be understood by a person skilled in the art that these functional blocks can be implemented in various forms, namely, solely in hardware, solely in software, or through a combination of hardware and software.

Figure 6:
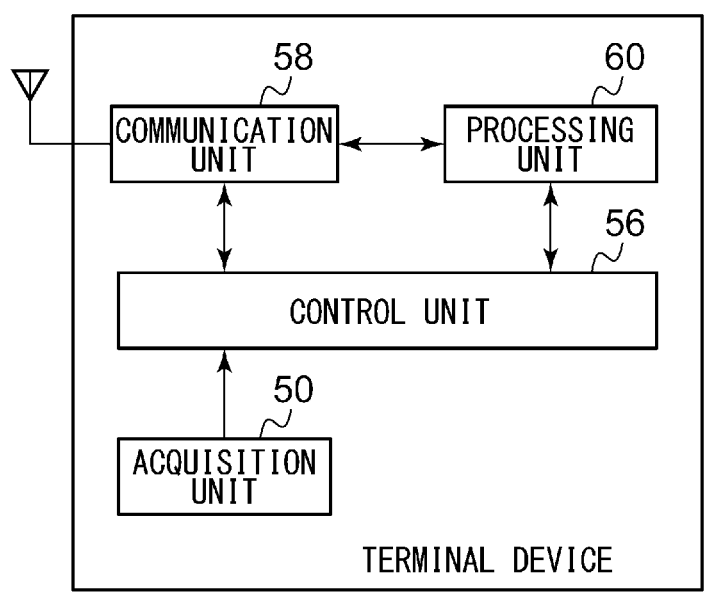
FIG. 6 is a view illustrating a configuration of a terminal device in FIG. 1.

FIG. 6 illustrates a configuration of the terminal device 16. The terminal device 16 includes an acquisition unit 50, a control unit 56, a communication unit 58, and a processing unit 60. The acquisition unit 50 has a positioning function by GPS, and periodically acquires positional information on the terminal device 16. Alternatively, the positioning function provided by the acquisition unit 50 may correspond to other systems other than GPS. Also herein, the positional information is indicated, for example, by latitude and longitude. The acquisition unit 50 outputs the positional information to the communication unit 58 via the control unit 56.

The communication unit 58 executes communication with the base station device 14 through business-use radio. When inputting the positional information from the acquisition unit 50 via the control unit 56, the communication unit 58 transmits the positional information to the base station device 14. After the transmission of the positional information, the communication unit 58 receives an area No. from the base station device 14. The communication unit 58 outputs the received area No. (first area No.) to the control unit 56. Further, the communication unit 58 receives the call signal from the base station device 14. As described above, the call signal includes an area No. to be called. The communication unit 58 inputs the area No. (second area No.) included in the call signal to the control unit 56.

The control unit 56 inputs the first area No. and the second area No. from the communication unit 58. When both the area Nos. match each other, the control unit 56 determines to execute communication with the base station device 14 and the command device 10 via the network 12. When a plurality of the second area Nos. are input, the control unit 56 determines to execute communication when one of the second area Nos. and the first area No. match each other. When the control unit 56 determines to execute communication, the communication unit 58 transmits a response signal to the base station device 14. Subsequently, the communication unit 58 and the processing unit 60 execute communication.

Figure 7:
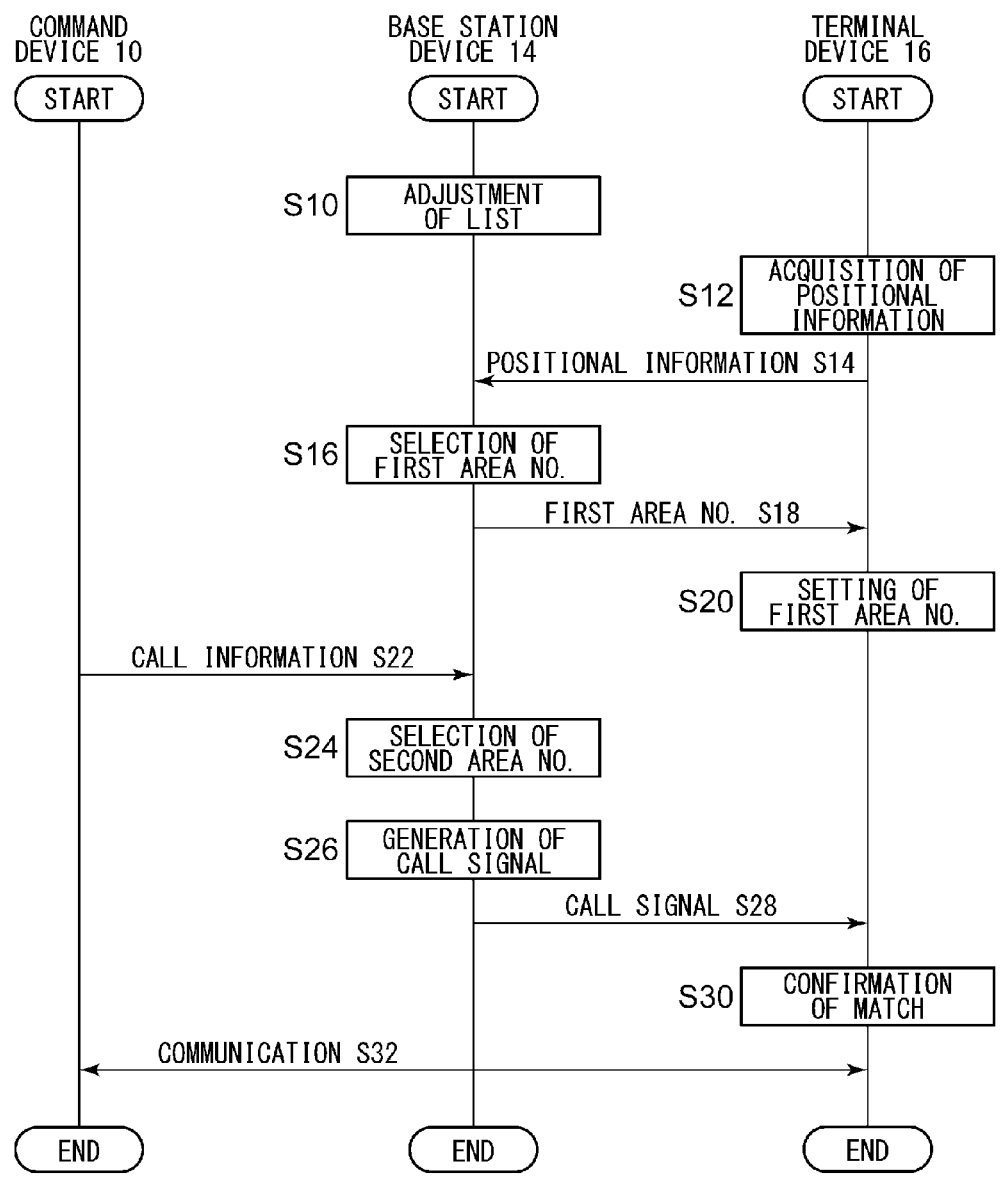
FIG. 7 is a sequence diagram illustrating communication procedures by the communication system of FIG. 1.

An operation of the communication system 100 configured as described above will be described. FIG. 7 is a sequence diagram illustrating communication procedures by the communication system 100. The base station device 14 adjusts a list (S10). The terminal device 16 acquires positional information (S12), and transmits it to the base station device 14 (S14). The base station device 14 selects the first area No. (S16), and transmits it to the terminal device 16 (S18). The terminal device 16 sets the first area No. (S20). The command device 10 transmits call information to the base station device 14 (S22). The base station device 14 selects the second area No. (S24), and generates a call signal (S26). The base station device 14 transmits the call signal including the second area No. (S28). When the terminal device 16 confirms the match between the first area No. and the second area No. (S30), the command device 10 and the terminal device 16 execute communication (S32).

Figure 8:
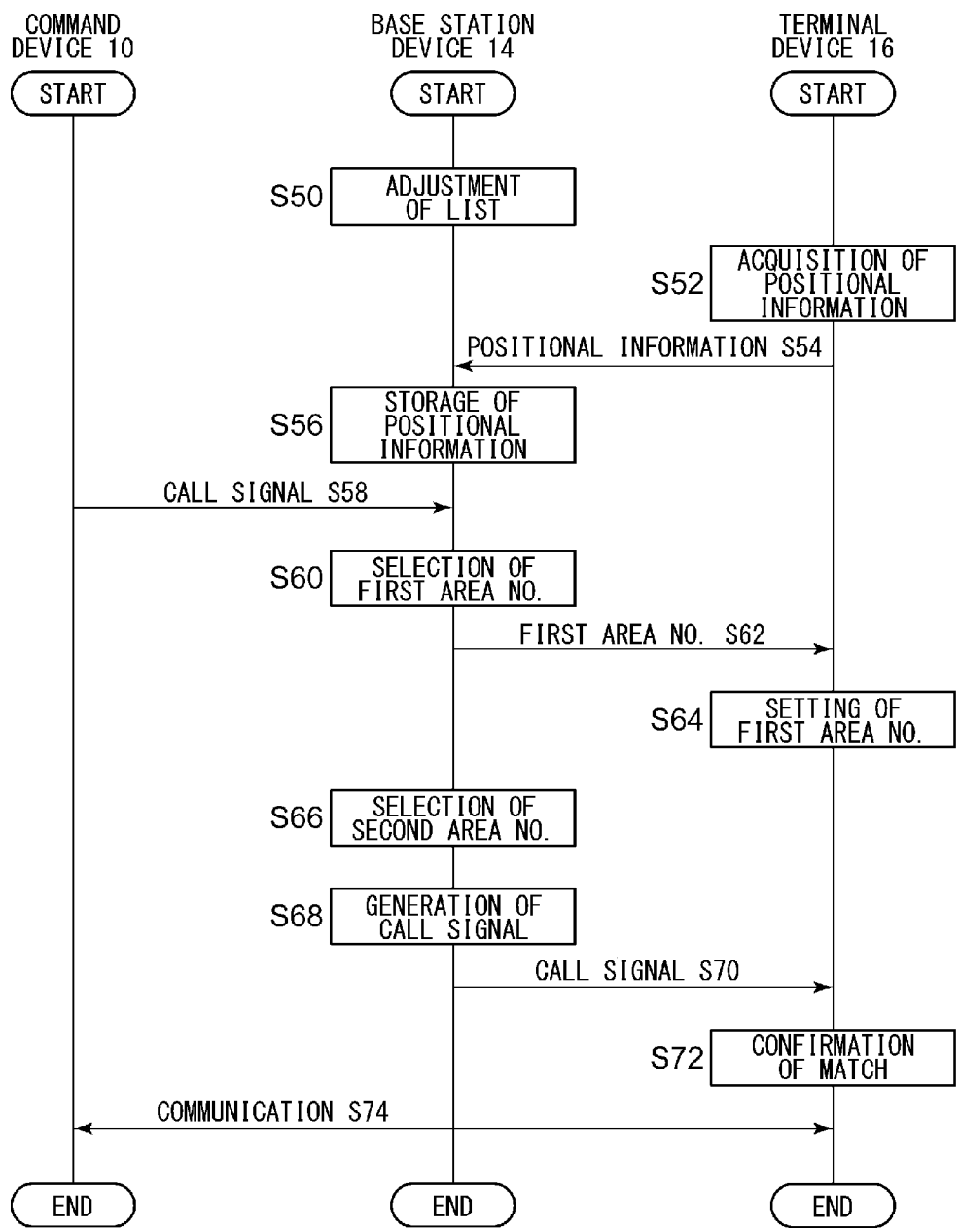
FIG. 8 is a sequence diagram illustrating other communication procedures by the communication system of FIG. 1.

FIG. 8 is a sequence diagram illustrating other communication procedures by the communication system 100. The base station device 14 adjusts a list (S50). The terminal device 16 acquires positional information (S52), and transmits it to the base station device 14 (S54). The base station device 14 stores the positional information (S56). The command device 10 transmits call information to the base station device 14 (S58). The base station device 14 selects a first area No. based on positional information (S60), and transmits it to the terminal device 16 (S62). The terminal device 16 sets the first area No. (S64). The base station device 14 selects a second area No. based on the call information (S66), and generates a call signal (S68). The base station device 14 transmits the call signal including the second area No. (S70). When the terminal device 16 confirms the match between the first area No. and the second area No. (S72), the command device 10 and the terminal device 16 execute communication (S74).

According to the present Example, a terminal device is called by using an area No., and hence a call of a predetermined area can be easily executed. An area No. for identifying a terminal device is notified to the terminal device based on the positional information of a terminal device, and hence it can be made unnecessary to cause the terminal device to hold a list. Further, a terminal device is not caused to hold a list, and hence a configuration of the terminal device can be simplified. Furthermore, a phone conversation can be performed by designating only an area to be called, and hence it becomes unnecessary to find out who is present in the area. Still furthermore, it becomes unnecessary to find out who is present in an area, and hence the time until a phone conversation can be reduced.

Still furthermore, a list is adjusted, and hence a list in accordance with a situation can be used. Still furthermore, one of a plurality of types of lists is switched to and used, and hence a list in accordance with a situation can be used. Still furthermore, the size of an area covered by one area No. is changed by switching a list, the target region of the terminal devices that can be called can be changed. Accordingly, the size of an area, for which only the requisite minimum number of policemen can be called, can be set in accordance with a time zone. Still furthermore, an area No. is transmitted in advance before the transmission of a call signal, and hence leeway can be allowed in the processing period in a terminal device. Still furthermore, an area No. is also transmitted when a call signal is transmitted, and hence an increase in a traffic amount can be suppressed.

EXAMPLE 2

Example 2 will now be described. Similarly to the above description, Example 2 corresponds to business-use radio, and relates to a communication system in which a terminal device is called by an area No. A base station device in Example 3 also adjusts a list in accordance with a predetermined condition. Herein, a list is adjusted such that the size of an area is changed in accordance with the type of an event that has occurred. A communication system 100 and a terminal device 16 according to Example 2 are of similar types to those illustrated in FIGS. 1 and 6, respectively. The description herein centers on the differences.

Figure 9:
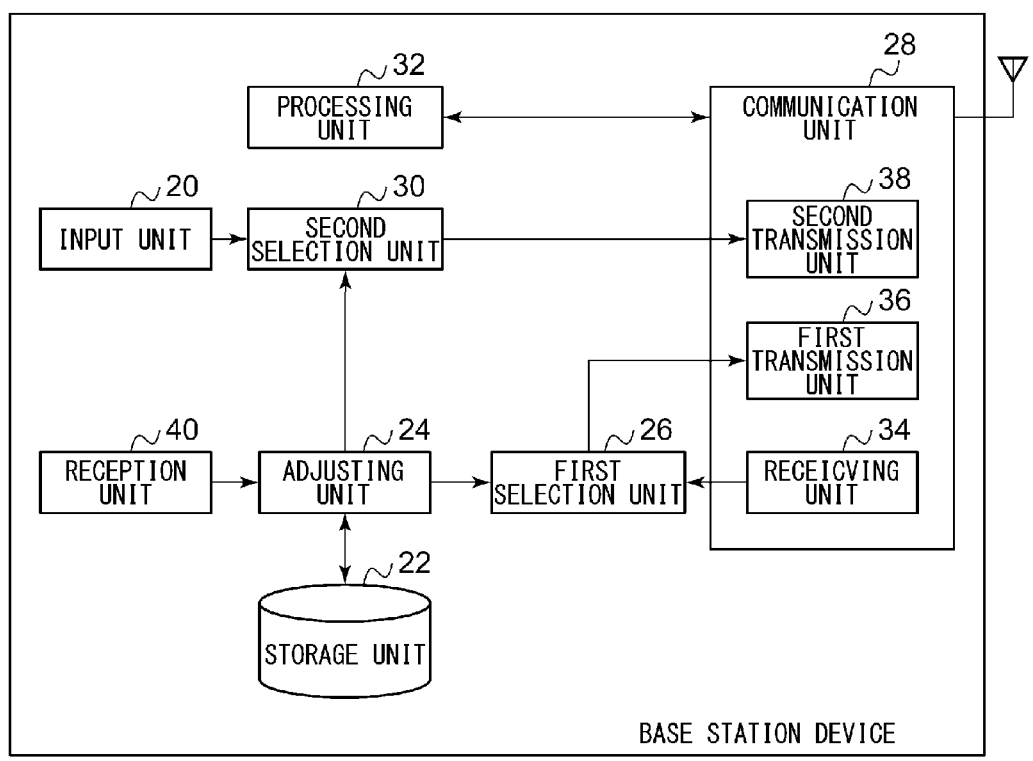
FIG. 9 a view illustrating a configuration of abase station device according to Example 2.

FIG. 9 illustrates a configuration of a base station device 14 according to Example 2. The base station device 14 includes an input unit 20, a storage unit 22, an adjusting unit 24, a first selection unit 26, a communication unit 28, a second selection unit 30, a processing unit 32, and a reception unit 40. The communication unit 28 includes a receiving unit 34, a first transmission unit 36, and a second transmission unit 38. Similarly to the above description, the storage unit 22 stores a list. Alternatively, the storage unit 22 may store a plurality of types of lists.

The reception unit 40 receives an instruction for changing the size of an area (hereinafter, referred to as "list information") from a command device 10. Herein, a commander who operates the command device 10 directly designates an area to be changed. For example, an area where an event has occurred is designated, and the area is divided into four small areas, to each of which a new area No. is given. The correspondence relationships between the divided areas and the newly given area Nos. are input to the reception unit 40 as list information. Herein, the number of the areas to be divided may not be one, but plural. Further, areas near one area that has been designated by a commander (adjacent areas) may be collectively divided, or a plurality of areas may be designated by a commander. Alternatively, processing for collecting a plurality of areas, which have been designated, into one area may be performed.

On the other hand, when the storage unit 22 stores a plurality lists, a commander selects a list to be used in accordance with the content of an event, so that the selected list is input to the command device 10. Information on the selected list is input to the reception unit 40 as list information. For example, identifiers (list Nos.) for identifying a plurality of lists can be used as the list information. The reception unit 40 outputs the list information to the adjusting unit 24.

The adjusting unit 24 inputs the list information from the reception unit 40. The adjusting unit 24 adjusts a list in accordance with the list information. Herein, the adjustment of a list also includes selection of the list. Because the subsequent processing in each of the base station device 14 and the terminal device 16 is similar to that described above, description thereof will be omitted herein.

Figure 10:
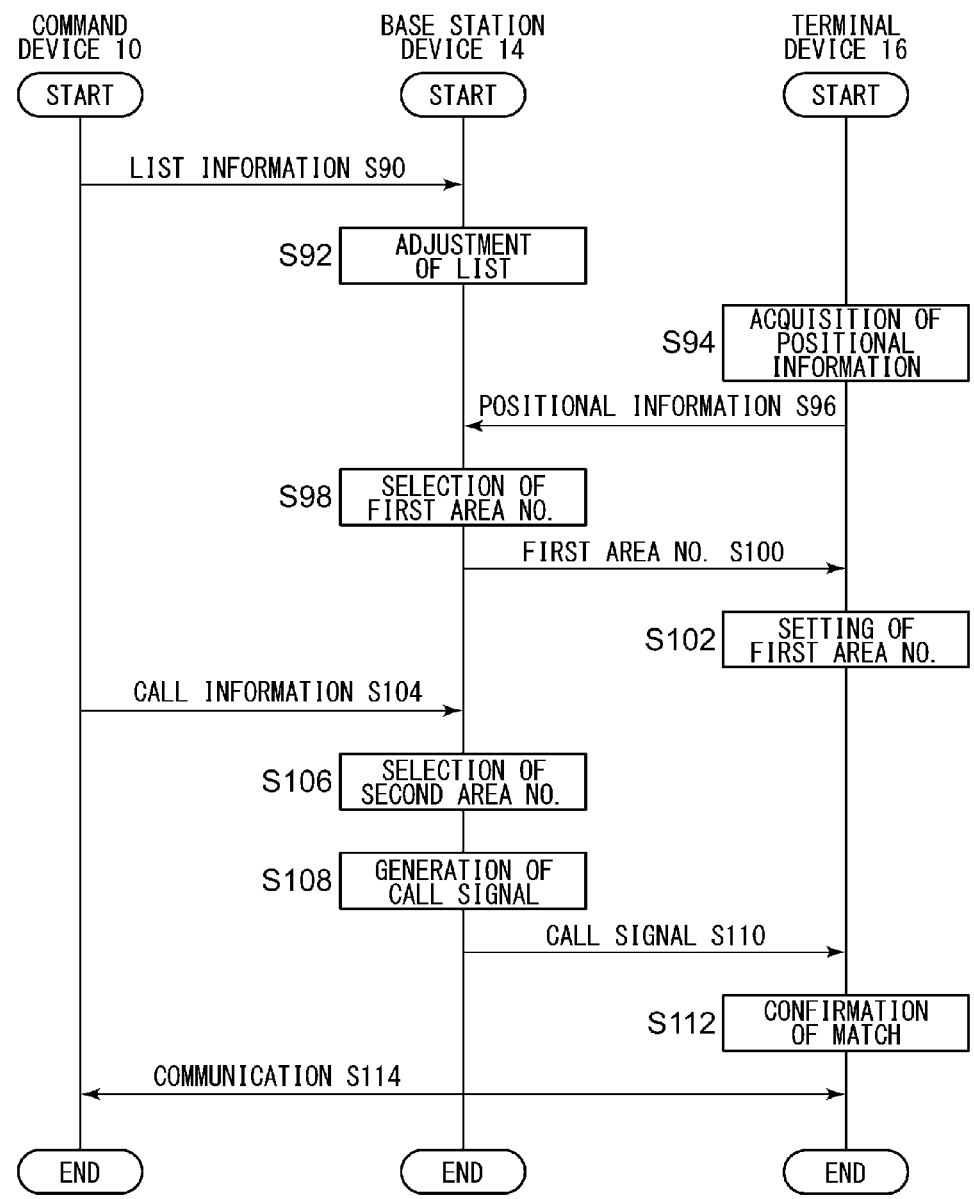
FIG. 10 is a sequence diagram illustrating communication procedures by a communication system according to Example 2.

An operation of the communication system 100 configured as described above will be described. FIG. 10 is a sequence diagram illustrating communication procedures by the communication system 100 according to Example 2. The command device 10 transmits list information to the base station device 14 (S90). The base station device 14 adjusts a list (S92). The terminal device 16 acquires positional information (S94), and transmits it to the base station device 14 (S96). The base station device 14 selects a first area No. (S98), and transmits it to the terminal device 16 (S100). The terminal device 16 sets the first area No. (S102). The command device 10 transmits call information to the base station device 14 (S104). The base station device 14 selects a second area No. (S106), and generates a call signal (S108). The base station device 14 transmits the call signal including the second area No. (S110). When the terminal device 16 confirms the match between the first area No. and the second area No. (S112), the command device 10 and the terminal device 16 execute communication (S114).

According to the present Example, a list is adjusted in accordance with the received list information, and hence a list reflecting the intention of a commander can be used. Further, a list reflecting the intention of a commander is used, and hence only persons close to a scene can be called. Furthermore, only persons close to a scene are called, and hence it can be avoided to call many persons uselessly. Still furthermore, the range of an area No. is changed in accordance with the type of an event that has occurred, and hence it becomes possible to call the requisite minimum number of persons. Still furthermore, it becomes possible to call the requisite minimum number of persons, and hence useless motion (an unnecessary person hastens to a scene, etc.) can be avoided.

EXAMPLE 3

Example 3 will now be described. Similarly to the above description, Example 3 corresponds to business-use radio, and relates to a communication system in which a terminal device is called by an area No. A base station device in Example 3 also adjusts a list in accordance with a predetermined condition. Herein, a list is adjusted to change the size of a list particularly in accordance with the density of terminal devices. When a crime has occurred at a location and it is desirable to dispatch policemen there, and when many policemen are present near the location where the crime has occurred, it is more desirable to call only policemen present nearby by making an area near the location smaller. On the other hand, when the number of policemen present near a location where a crime has occurred is small, it is possible to call policemen present within a somewhat broad range by making an area near the location large. It is more desirable that a response can be guaranteed even when an area is large (even when pinpoint accuracy is decreased) than that no policeman is present in a desired area and there is no response. A communication system 100 and a terminal device 16 according to Example 3 are of similar types to those illustrated in FIGS. 1 and 6, respectively. The description herein centers on the differences.

Figure 11:
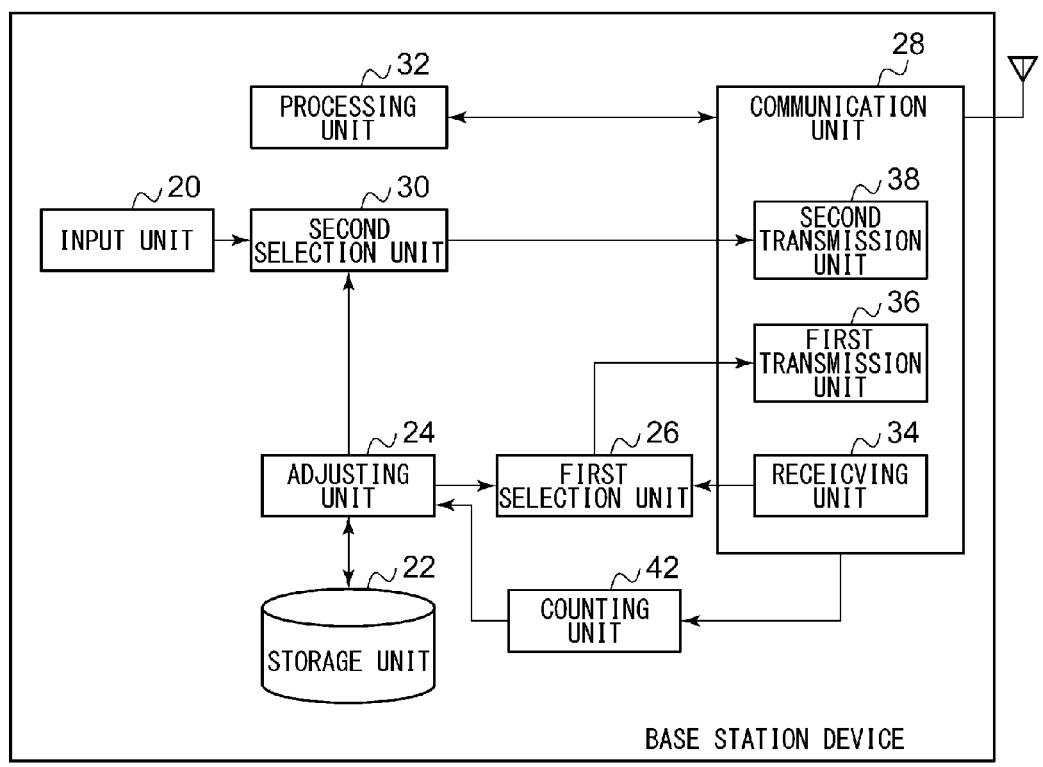
FIG. 11 is a view illustrating a configuration of a base station device according to Example 3.

FIG. 11 illustrates a configuration of abase station device 14 according to Example 3. The base station device 14 includes an input unit 20, a storage unit 22, an adjusting unit 24, a first selection unit 26, a communication unit 28, a second selection unit 30, a processing unit 32, and a counting unit 42. The communication unit 28 includes a receiving unit 34, a first transmission unit 36, and a second transmission unit 38. The counting unit 42 counts the number of the terminal devices 16 which have been connected to the base station device 14 for a predetermined period. Herein, the counting may be performed for every area or every area group in which a plurality of areas are collected. Accordingly, it can be said that the number of the counted terminal devices 16 is a density in an area or an area group. In the following description, every area is adopted for clarity of the description. The counting unit 42 outputs a result of the counting to the adjusting unit 24. Similarly to the above description, the storage unit 22 stores a list. Alternatively, the storage unit 22 may store a plurality of types of lists.

The adjusting unit 24 adjusts the list stored in the storage unit 22 such that the list includes an area whose size is in accordance with the result of the counting in the counting unit 42. For example, the adjusting unit 24 divides an area in the list stored in the storage unit 22, when the density is high. When the density in a specific area becomes high after an area having a size of 1 km×1 km has been divided into areas each having a size of 100 m×100 m, the specific area is further subdivided (for example, 50 m×50 m). Thus, the size of an area may be changed multiple times in accordance with a density. On the other hand, the adjusting unit 24 annexes areas in the list stored in the storage unit 22, when a density is low. In such a case where, for example, no terminal device 16 is present in an area (area A) having a size of 1 km×1 km but the terminal device 16 is present in the adjacent area (area B), both the area A and the area B are annexed into one area, so that they are called by one area No. Alternatively, an area may be expanded by repeating such annexation processing multiple times.

When the storage unit 22 stores a plurality of types of lists, the adjusting unit 24 selects a list corresponding to the size of an area in accordance with the result of the counting. For example, when the number of the terminal devices 16 in an area is more than or equal to a first threshold value, the adjusting unit 24 selects a list in which the area is small, and when the number thereof is smaller than or equal to a second threshold value, the adjusting unit 24 selects a list in which the area is large. Because the subsequent processing in each of the base station device 14 and the terminal device 16 is similar to that described above, description thereof will be omitted herein.

Figure 12:
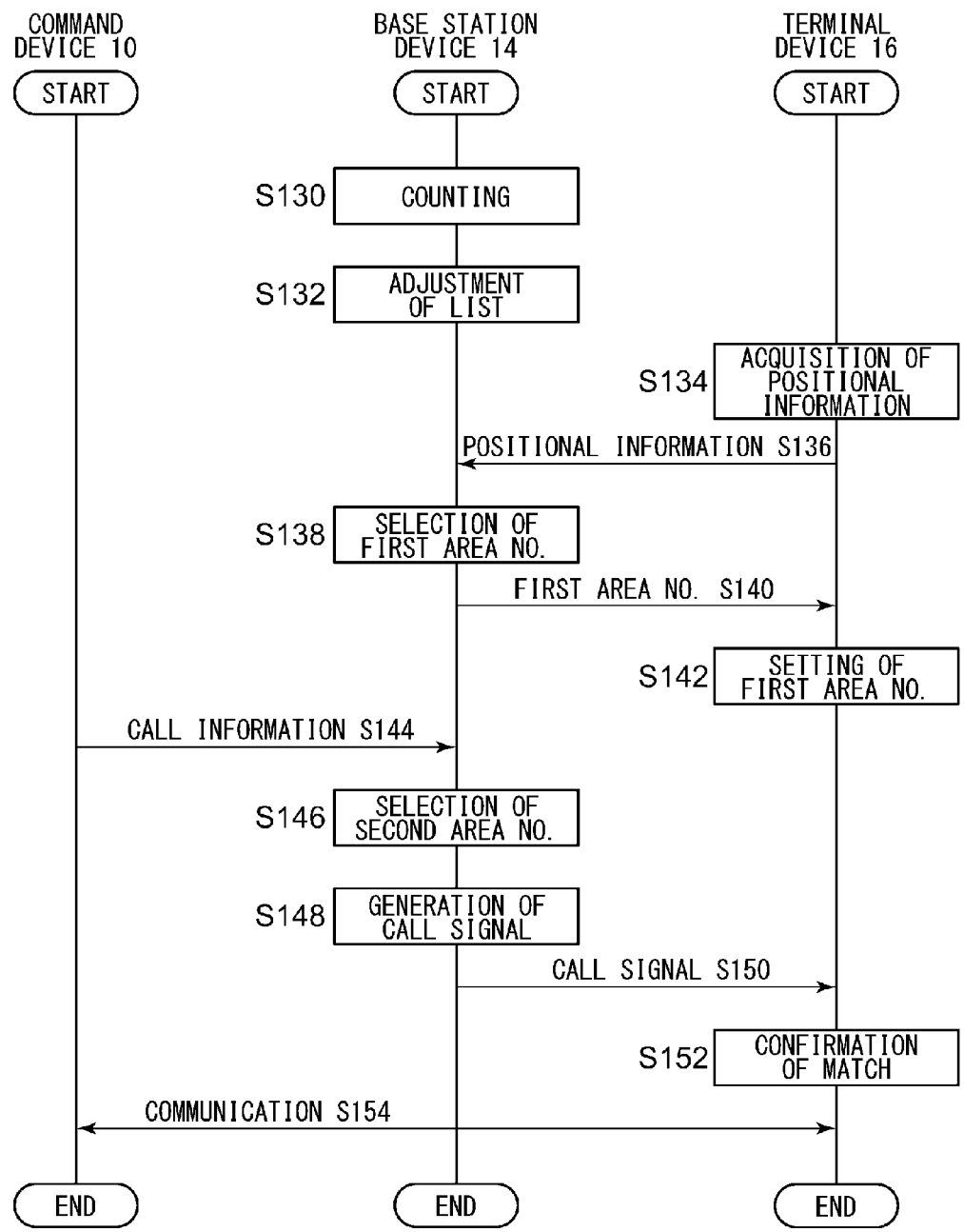
FIG. 12 is a sequence diagram illustrating communication procedures by a communication system according to Example 3.

An operation of the communication system 100 configured as described above will be described. FIG. 12 is a sequence diagram illustrating communication procedures by the communication system 100 according to Example 3. The base station device 14 counts the number of the terminal devices 16 (S130). The base station device 14 adjusts a list (S132). The terminal device 16 acquires positional information (S134), and transmits it to the base station device 14 (S136). The base station device 14 selects a first area No. (S138), and transmits it to the terminal device 16 (S140). The terminal device 16 sets the first area No. (S142). The command device 10 transmits call information to the base station device 14 (S144). The base station device 14 selects a second area No. (S146), and generates a call signal (S148). The base station device 14 transmits the call signal including the second area No. (S150). When the terminal device 16 confirms the match between the first area No. and the second area No. (S152), the command device 10 and the terminal device 16 execute communication (S154).

According to the present Example, the size of an area is changed in accordance with the number of terminal devices, and hence an efficient call can be achieved. Further, an efficient call is achieved, and hence a useless call can be suppressed. Furthermore, the processing in the terminal device is the same even when the size of an area is changed, and hence the processing in the terminal device can be simplified.

The present invention has been described above based on examples. These examples are illustrative in nature, and it should be appreciated by a person skilled in the art that various modifications can be made to the combinations of the components and the processing processes and such modifications also fall within the scope of the present invention.

According to the present Examples, the communication system 100 uses business-use radio. However, without being limited to this, for example, a wireless communication system other than business-use radio may be used. According to the present variation, the flexibility of a configuration can be improved.

In any one of Examples 1 to 3, the selection of an area No., the adjustment of a list, and the storage of a list are performed in the base station device 14. However, without being limited to this, at least one processing of them may be performed, for example, in a combination of the command device 10 and the base station device 14 or in the command device 10. According to the present variation, the flexibility of a configuration can be improved.

What is claimed is:

1. A calling device comprising:
    a storage unit that stores a list in which a correspondence relationship between coordinates of a plurality of areas defined and identifiers is included, the plurality of areas being formed by dividing a predetermined area and being displayable on a map;
    an adjusting unit that adjusts the correspondence relationship included in the list by changing a size of each of the plurality of areas and thereby changing coordinates of the area, and further by changing identifiers;
    a receiving unit that receives positional information indicating latitude and longitude of a terminal device;
    a first selection unit that compares coordinates of an area included in the list adjusted in the adjusting unit with the positional information received, identifies an area including the positional information received, and selects an identifier corresponding to the area identified;
    a first transmission unit that transmits the identifier selected in the first selection unit to the terminal device;
    an input unit that inputs call information including positional information indicating latitude and longitude related to a terminal device to be called;
    a second selection unit that compares coordinates of an area included in the list adjusted in the adjusting unit with the positional information included in the call information, identifies an area including the positional information included in the call information, and selects an identifier corresponding to the area identified; and
    a second transmission unit that transmits a call signal including the identifier selected in the second selection unit.

2. The calling device according to claim 1, further comprising a reception unit that receives an instruction for changing a size of an area, wherein
    the adjusting unit executes adjustment in accordance with the instruction received in the reception unit.

3. The calling device according to claim 1, wherein the adjusting unit adjusts the correspondence relationship included in the list in accordance with at least one information of time information, calendar information, and external sensor information.

4. The calling device according to claim 1, further comprising a counting unit that counts the number of terminal devices which have been connected to the calling device, wherein the adjusting unit executes adjustment in accordance with the number counted in the counting unit.

5. The calling device according to claim 4, wherein:
    the counting unit counts the number of terminal devices located in each of the plurality of areas stored in the storage unit; and
    the adjusting unit performs adjustment such that the larger the number of terminal devices in an area, the smaller the area.

6. The calling device according to claim 1, wherein the first transmission unit transmits an identifier after the input unit inputs information.

7. A communication system comprising:
a calling device; and
a terminal device, wherein
the calling device includes:
a storage unit that stores a list in which a correspondence relationship between coordinates of a plurality of areas defined and identifiers is included, the plurality of areas being formed by dividing a predetermined area and being displayable on a map;
an adjusting unit that adjusts the correspondence relationship included in the list by changing a size of each of the plurality of areas and thereby changing coordinates of the area, and further by changing identifiers;
a receiving unit that receives positional information indicating latitude and longitude of a terminal device;
a first selection unit that compares coordinates of an area included in the list adjusted in the adjusting unit with the positional information received, identifies an area including the positional information received, and selects an identifier corresponding to the area identified;
a first transmission unit that transmits the identifier selected in the first selection unit to the terminal device;
an input unit that inputs call information including positional information indicating latitude and longitude related to a terminal device to be called;
a second selection unit that compares coordinates of an area included in the list adjusted in the adjusting unit with the positional information included in the call information, identifies an area including the positional information included in the call information, and selects an identifier corresponding to the area identified; and
a second transmission unit that transmits a call signal including the identifier selected in the second selection unit.

8. A calling method comprising the steps of:
wherein a plurality of areas formed by dividing a predetermined area and displayable on a map are defined and a list including correspondence relationship between coordinates of the areas and identifiers is stored in a memory, adjusting correspondence relationship in the list by changing a size of each of the plurality of areas and thereby changing coordinates of the area, and further by changing identifiers;
receiving positional information indicating latitude and longitude of a terminal device;
comparing coordinates of an area included in the adjusted list with the positional information received, identifying an area including the positional information received, and selecting a first identifier corresponding to the area identified;
transmitting the selected first identifier to the terminal device;
inputting call information including positional information indicating latitude and longitude related to a terminal device to be called;
comparing coordinates of an area included in the adjusted list with the positional information included in the call information, identifying an area including the positional information included in the call information, and selecting a second identifier corresponding to the area identified; and
transmitting a call signal including the selected second identifier.

* * * * *